(12) United States Patent
Higashi et al.

(10) Patent No.: US 6,904,346 B2
(45) Date of Patent: Jun. 7, 2005

(54) STEERING SYSTEM FOR MOTOR VEHICLE

(75) Inventors: Masayasu Higashi, Tondabayashi (JP); Masaya Segawa, Yamatokooriyama (JP); Shingo Maeda, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/396,411

(22) Filed: Mar. 26, 2003

(65) Prior Publication Data

US 2003/0187559 A1 Oct. 2, 2003

(30) Foreign Application Priority Data

Mar. 27, 2002 (JP) ........................................ 2002-087959

(51) Int. Cl.[7] .............................. G06F 7/00; B62D 5/04
(52) U.S. Cl. ........................... 701/41; 701/43; 180/443; 180/446
(58) Field of Search ............................... 701/41, 43, 36; 180/402, 403, 412, 413, 421–423, 443–446

(56) References Cited

U.S. PATENT DOCUMENTS

| 5,259,473 A | * | 11/1993 | Nishimoto | 180/446 |
|---|---|---|---|---|
| 5,268,841 A | * | 12/1993 | Mouri | 701/42 |
| 5,271,474 A | * | 12/1993 | Nishimoto et al. | 180/446 |
| 5,317,513 A | * | 5/1994 | Mouri | 701/42 |
| 6,041,884 A | * | 3/2000 | Shimizu et al. | 180/443 |
| 6,424,900 B2 | * | 7/2002 | Murray et al. | 701/48 |
| 6,442,462 B1 | * | 8/2002 | Nishizaki et al. | 701/41 |
| 6,687,590 B2 | * | 2/2004 | Kifuku et al. | 701/43 |
| 6,704,632 B2 | * | 3/2004 | Itoh | 701/43 |
| 2003/0114969 A1 | * | 6/2003 | Dominke et al. | 701/41 |

FOREIGN PATENT DOCUMENTS

JP       10218000 A   *  8/1998   ............ B62D/6/00

* cited by examiner

Primary Examiner—Jacques H. Louis-Jacques
(74) Attorney, Agent, or Firm—Rabin & Berdo, P.C.

(57) ABSTRACT

A Steering system for a motor vehicle is provided. The system is provided with a principal steering actuator for applying a driving force to a steering mechanism; an auxiliary steering actuator capable of applying a driving force to the steering mechanism; a counter force actuator for applying a counter force to an operation member; a principal steering control section; an auxiliary steering control section; a counter force control section; first and second vehicle condition sensors; and a main controller for comprehensively controlling the control sections. An output signal of the first vehicle condition sensor is inputted to the main controller through a first vehicle condition signal line; and an output signal of the second vehicle condition sensor is inputted, through a second vehicle condition signal line, to at least one of the control sections.

14 Claims, 3 Drawing Sheets

STEERING SYSTEM FOR MOTOR VEHICLE

BACKGROUND OF THE INVENTION

1. Field of the Invention

The present invention relates to a motor vehicle steering system which is adapted to drive a steering mechanism on the basis of the operation of an operation member such as a steering wheel for turning steerable vehicle wheels.

2. Description of Related Art

A steering system (so-called "steer-by-wire system") for a motor vehicle has been proposed, which has no mechanical coupling between a steering wheel and a steering mechanism for turning steerable vehicle wheels, and is adapted to detect the direction and amount of the operation of the steering wheel and apply a driving force to the steering mechanism from a steering actuator such as an electric motor on the basis of the results of the detection.

With this arrangement, a ratio (gear ratio) between the turning amount of the steerable vehicle wheels and the operation amount of the steering wheel can flexibly be changed according to the traveling state of the motor vehicle for improvement of the maneuverability of the motor vehicle. In addition, the aforesaid arrangement is advantageous in that the upward thrust of the steering wheel can be prevented at collision of the motor vehicle and in that the steering wheel can more flexibly be located.

FIG. 3 is a block diagram illustrating the electrical construction of the steer-by-wire system. Detection signals such as indicative of the direction and amount of the operation of the steering wheel are inputted to a main electronic control unit (ECU) 101. A principal steering motor 105 and an auxiliary steering motor 106 are connected to the steering mechanism, and a counter force motor 107 is connected to the steering wheel. The principal steering motor 105 and the auxiliary steering motor 106 are each adapted to apply the driving force to the steering mechanism for turning the steerable vehicle wheels. The auxiliary steering motor 106 is operative to apply the driving force to the steering mechanism when the principal steering motor 105 and/or its control system malfunction. The counter force motor 107 applies a counter force to the steering wheel according to a reaction force from a road surface.

The principal steering motor 105 is controlled to be driven by a principal steering electronic control unit 102, and the auxiliary steering motor 106 is controlled to be driven by an auxiliary steering electronic control unit 103. The counter force motor 107 is controlled to be driven by a counter force electronic control unit 104. The principal steering electronic control unit 102, the auxiliary steering electronic control unit 103 and the counter force electronic control unit 104 are comprehensively controlled by the main electronic control unit 101.

Detection signals are inputted to the main electronic control unit 101 from an operation angle sensor 111 for detecting the operation angle of the steering wheel, a torque sensor 112 for detecting an operation torque applied to the steering wheel, a steering angle sensor 113 for detecting the turning angle of the steerable vehicle wheels and a vehicle speed sensor 114 for detecting the speed of the motor vehicle (vehicle speed).

The main electronic control unit 101 controls the principal steering electronic control unit 102, the auxiliary steering electronic control unit 103 and the counter force electronic control unit 104 on the basis of the detection signals from the sensors 111 to 114. That is, the main electronic control unit 101 transmits necessary ones of the detection signals from the sensors 111 to 114 to the principal steering electronic control unit 102, the auxiliary steering electronic control unit 103 and the counter force electronic control unit 104, and generates control commands for controlling the electronic control units 102 to 104.

Thus, the steering force is properly transmitted from the principal steering motor 105 to the steering mechanism according to the operation of the steering wheel, and the counter force is properly transmitted from the counter force motor 107 to the steering wheel according to the reaction force from the road surface. If the principal steering electronic control unit 102, the principal steering motor 105 or the like malfunctions, the auxiliary steering electronic control unit 103 properly controls the auxiliary steering motor 106 upon reception of a control command from the main electronic control unit 101.

With the aforesaid arrangement, however, the detection signals from the sensors 111 to 114 which detect the steering conditions of the motor vehicle are inputted only to the main electronic control unit 101, but not inputted directly to the principal steering electronic control unit 102, the auxiliary steering electronic control unit 103 and the counter force electronic control unit 104.

Therefore, the detection signals from the sensors 111 to 114 are not transmitted to the electronic control units 102, 103, 104, if the main electronic control unit 101 malfunctions. This makes it impossible to properly control the principal steering motor 105, the auxiliary steering motor 106 and the counter force motor 107.

SUMMARY OF THE INVENTION

It is an object of the present invention to provide a steering system for a motor vehicle, which is capable of properly performing a control operation on the basis of vehicle condition signals related to the steering conditions of the motor vehicle even if a main electronic control unit malfunctions.

In accordance with one aspect of the present invention, there is provided a steering system for a motor vehicle, which comprises: an operation member for steering the motor vehicle; a steering mechanism for turning steerable vehicle wheels according to operation of the operation member; a principal steering actuator for applying a driving force to the steering mechanism; an auxiliary steering actuator capable of applying a driving force to the steering mechanism; a counter force actuator for applying a counter force to the operation member according to a reaction force from a road surface; a principal steering control section for controlling the principal steering actuator; an auxiliary steering control section for controlling the auxiliary steering actuator; a counter force control section for controlling the counter force actuator; first and second vehicle condition sensors for detecting vehicle conditions related to steering control of the motor vehicle; a main controller for comprehensively controlling the principal steering control section, the auxiliary steering control section and the counter force control section; a first vehicle condition signal line through which an output signal of the first vehicle condition sensor is inputted to the main controller; and a second vehicle condition signal line through which an output signal of the second vehicle condition sensor is inputted to at least one of the principal steering control section, the auxiliary steering control section and the counter force control section.

With this arrangement, when the main controller malfunctions, a control operation (for controlling the principal steering actuator or the auxiliary steering actuator and the counter force actuator) can thereafter continuously be performed properly according to the vehicle conditions by the principal steering control section, the auxiliary steering control section or the counter force control section which receives the output signal of the second vehicle condition sensor. This improves the reliability of the motor vehicle steering system.

The motor vehicle steering system preferably further comprises a control signal line through which a control signal is inputted from the at least one of the principal steering control section, the auxiliary steering control section and the counter force control section which receives the output signal of the second vehicle condition sensor inputted thereto through the second vehicle condition signal line to the other control sections (exclusive of the main controller).

The at least one of the principal steering control section, the auxiliary steering control section and the counter force control section which receives the output signal of the second vehicle condition sensor inputted thereto through the second vehicle condition signal line preferably inputs the control signal to the other control sections (exclusive of the main controller) through the control signal line, when the main controller malfunctions.

With this arrangement, the control section which receives the output signal of the second vehicle condition sensor can control the other control sections (and further control the principal steering actuator or the counter force actuator via the other control sections). Therefore, the control operation can properly be performed when the main controller malfunctions.

The at least one of the principal steering control section, the auxiliary steering control section and the counter force control section which receives the output signal of the second vehicle condition sensor inputted thereto through the second vehicle condition signal line preferably performs an open loop control operation on the other control sections (exclusive of the main controller) by inputting the control signal to the other control sections through the control signal line.

With this arrangement, the control of the other control sections by the at least one control section which receives the output signal of the second vehicle condition sensor (and the control of the principal steering actuator or the counter force actuator via the other control sections) is performed on an open loop basis. Therefore, the control system can be simplified, so that the costs can correspondingly be reduced.

In accordance with another aspect of the present invention, there is provided a steering system for a motor vehicle, which comprises: an operation member for steering the motor vehicle; a steering mechanism for turning steerable vehicle wheels according to operation of the operation member; a principal steering actuator for applying a driving force to the steering mechanism; a counter force actuator for applying a counter force to the operation member according to a reaction force from a road surface; a principal steering control section for controlling the principal steering actuator; a counter force control section for controlling the counter force actuator; first and second vehicle condition sensors for detecting vehicle conditions related to steering control of the motor vehicle; a main controller for comprehensively controlling the principal steering control section and the counter force control section; a first vehicle condition signal line through which an output signal of the first vehicle condition sensor is inputted to the main controller; and a second vehicle condition signal line through which an output signal of the second vehicle condition sensor is inputted to at least one of the principal steering control section and the counter force control section.

With this arrangement, even when the main controller malfunctions, a control operation (for controlling the principal steering actuator and the counter force actuator) can thereafter continuously be performed properly according to the vehicle conditions by the principal steering control section or the counter force control section which receives the output signal of the second vehicle condition sensor.

The motor vehicle steering system preferably further comprises a control signal line through which a control signal is inputted from the one of the principal steering control section and the counter force control section which receives the output signal of the second vehicle condition sensor inputted thereto through the second vehicle condition signal line to the other control section (exclusive of the main controller).

The one of the principal steering control section and the counter force control section which receives the output signal of the second vehicle condition sensor inputted thereto through the second vehicle condition signal line preferably inputs the control signal to the other control section (exclusive of the main controller) through the control signal line, when the main controller malfunctions.

The one of the principal steering control section and the counter force control section which receives the output signal of the second vehicle condition sensor inputted thereto through the second vehicle condition signal line preferably performs an open loop control operation on the other control section (exclusive of the main controller) by inputting the control signal to the other control section through the control signal line.

The foregoing and other objects, features and effects of the present invention will become more apparent from the following description of the preferred embodiments with reference to the attached drawings.

DESCRIPTION OF THE PREFERRED EMBODIMENTS

Figure 1:
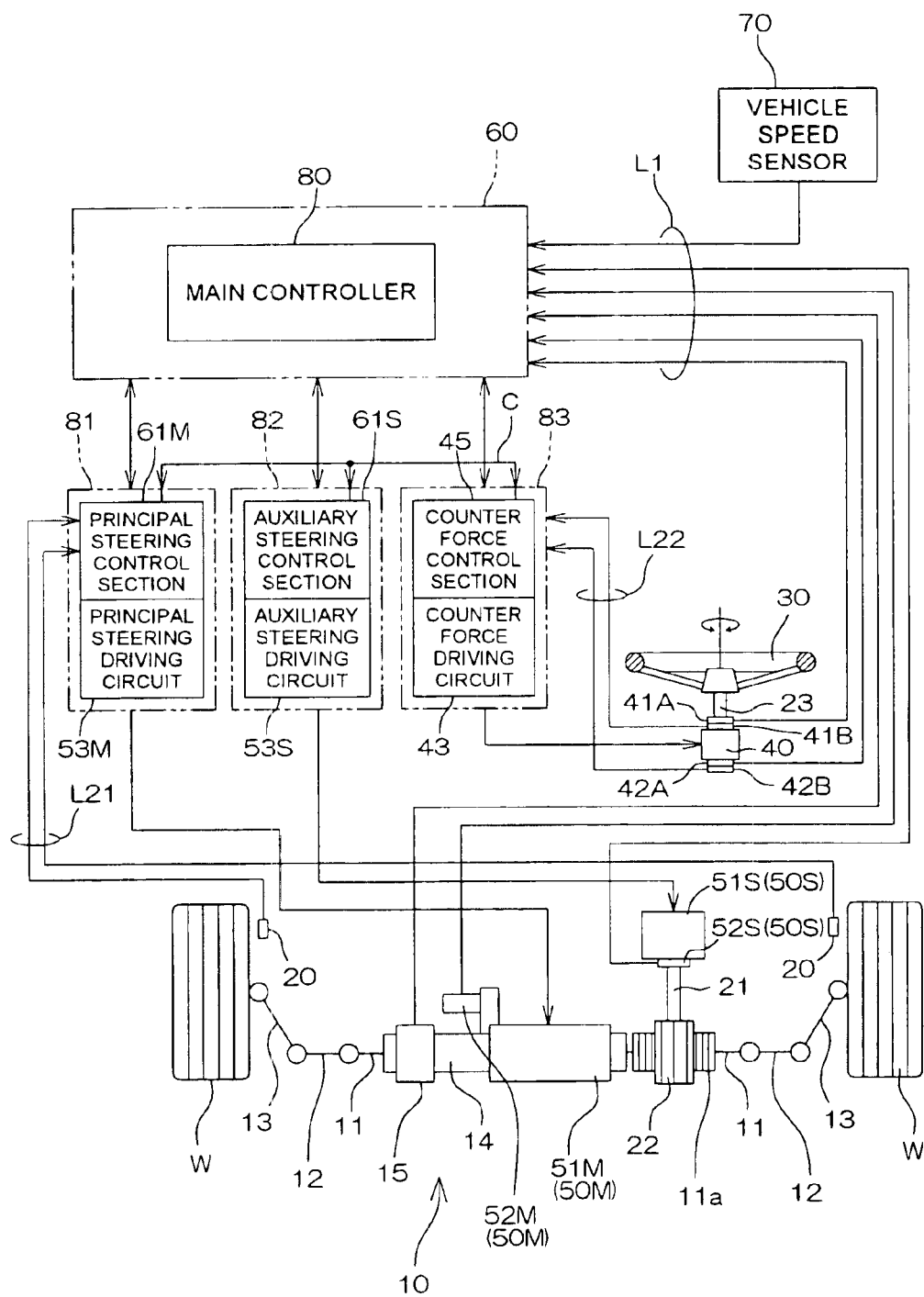
FIG. 1 is a conceptual diagram for explaining the basic construction of a motor vehicle steering system according to a first embodiment of the present invention.

FIG. 1 is a conceptual diagram for explaining the basic construction of a steering system for a motor vehicle in accordance with a first embodiment of the present invention. The motor vehicle steering system includes a steering mechanism 10 for causing a pair of steerable vehicle wheels (typically, front vehicle wheels) W, W to perform a steering operation, and a steering wheel 30 which has no mechanical coupling with the steering mechanism 10.

The motor vehicle steering system has a dual steering driving system including a principal steering driving system 50M and an auxiliary steering driving system 50S for driving the steering mechanism 10. The principal steering driving system 50M includes a principal steering actuator 51M and a principal rotation angle sensor 52M for detecting the rotation angle of the principal steering actuator 51M. On the other hand, the auxiliary steering driving system 50S includes an auxiliary steering actuator 51S and an auxiliary rotation angle sensor 52S for detecting the rotation angle of the auxiliary steering actuator 51S. The principal steering actuator 51M and the auxiliary steering actuator 51S are each constituted, for example, by an electric motor.

The steering mechanism 10 includes a steering shaft 11 extending transversely of a vehicle body and knuckle arms 13, 13 coupled to opposite ends of the steering shaft 11 via tie rods 12, 12 for supporting the steerable vehicle wheels W, W. The steering shaft 11 is supported by a housing 14 slidably along the axis thereof, and the principal steering actuator 51M is coaxially incorporated in the midst of the steering shaft 11.

The steering shaft 11 has a rack gear 11a formed around a part thereof, and the rack gear 11a is threadingly engaged with a pinion gear 22 provided at an end of a shaft 21. The shaft 21 is coupled to the auxiliary steering actuator 51S, so that a driving force generated by the auxiliary steering actuator 51S is inputted to the shaft 21.

With this arrangement, when the principal steering actuator 51M is driven, the rotational movement of the principal steering actuator 51M is converted into the sliding movement of the steering shaft 11 by a movement converting mechanism such as including a ball thread, whereby the steerable vehicle wheels W, W are turned by the sliding movement of the steering shaft 11. When the auxiliary steering actuator 51S is driven, the rotational movement of the shaft 21 caused by the auxiliary steering actuator 51S is converted into the sliding movement of the steering shaft 11 by the pinion gear 22 and the rack gear 11a, whereby the steerable vehicle wheels W, W are turned by the sliding movement of the steering shaft 11.

A counter force actuator 40 for applying a counter force to the steering wheel 30 correspondingly to a reaction force from a road surface is coupled to the steering wheel 30.

The counter force actuator 40 is constituted by an electric motor (e.g., a three-phase brushless motor) which includes a shaft 23 coupled to the steering wheel 30 as its rotation shaft, and a casing of the electric motor is fixed to a proper portion of the vehicle body. A pair of torque sensors 41A, 41B for detecting a steering torque inputted from the steering wheel 30 and a pair of operation angle sensors 42A, 42B for detecting the operation angle of the steering wheel 30 are provided adjacent the counter force actuator 40.

The counter force actuator 40, the principal steering actuator 51M and the auxiliary steering actuator 51S are supplied with driving electric currents from driving circuits 43, 53M and 53S, respectively.

Detection signals of the torque sensor 41A, the operation angle sensor 42A, the principal rotation angle sensor 52M and the auxiliary rotation angle sensor 52S are inputted to a main electronic control unit (ECU) 60 via a signal line L1. A steering position sensor 15 for detecting the axial position of the steering shaft 11 is provided in association with the steering shaft 11, and a detection signal of the steering position sensor 15 is also inputted to the main electronic control unit 60 via the signal line L1. A detection signal of a vehicle speed sensor 70 for detecting the speed of the motor vehicle is also inputted to the main electronic control unit 60 via the signal line L1.

A principal steering electronic control unit 81 is provided for feedback-controlling the electric current of the principal steering actuator 51M. The driving circuit (principal steering driving circuit) 53M for the principal steering actuator 51M and a principal steering control section 61M for feedback-controlling the electric current of the principal steering actuator 51M by applying a control signal to the principal steering driving circuit 53M are incorporated in the principal steering electronic control unit 81. The principal steering control section 61M includes a CPU (central processing unit).

Detection signals from vehicle wheel speed sensors 20 provided in association with the steerable vehicle wheels W or the other vehicle wheels in the motor vehicle are inputted to the control section 61M not via the main electronic control unit 60 but via a signal line L21.

An auxiliary steering electronic control unit 82 is provided for feedback-controlling the electric current of the auxiliary steering actuator 51S. The driving circuit (auxiliary steering driving circuit) 53S for the auxiliary steering actuator 51S and an auxiliary steering control section 61S for feedback-controlling the electric current of the auxiliary steering actuator 51S by applying a control signal to the auxiliary steering driving circuit 53S are incorporated in the auxiliary steering electronic control unit 82. The auxiliary steering control section 61S includes a CPU.

A counter force electronic control unit 83 is provided for feedback-controlling the electric current of the counter force actuator 40. The driving circuit (counter force driving circuit) 43 for the counter force actuator 40 and a counter force control section 45 for feedback-controlling the electric current of the counter force actuator 40 by applying a control signal to the counter force driving circuit 43 are incorporated in the counter force electronic control unit 83. The counter force control section 45 includes a CPU.

Detection signals from the torque sensor 41B and the operation angle sensor 42B are inputted to the counter force actuator 40 not via the main electronic control unit 60 but via a signal line L22.

The principal steering control section 61M, the auxiliary steering control section 61S and the counter force control section 45 are connected to each other via a control signal line C, so that control signals can be applied from one of the control sections to the other control sections.

The main electronic control unit 60 has a main controller 80 therein for comprehensively controlling the entire steering system. The main controller 80 includes a CPU, and monitors the operation of the principal steering electronic control unit 81. When the principal steering driving system 50M including the principal steering electronic control unit 81 malfunctions, the driving control of the auxiliary steering actuator 51S by the auxiliary steering electronic control unit 82 is started.

The main controller 80 comprehensively controls the principal steering control section 61M, the auxiliary steering control section 61S and the counter force control section 45 on the basis of the signals inputted from the sensors 41A, 42A, 52M, 52S, 15, 70, and transmits necessary ones of the sensor signals to the control sections 61M, 61S, 45.

The malfunction of the main electronic control unit 60, if occurring, is detected by at least one of the principal steering control section 61M, the auxiliary steering control section 61S and the counter force control section 45. Thus, the principal steering control section 61M, the auxiliary steering control section 61S and the counter force control section 45 start performing a control operation independently of a control command from the main controller 80.

For example, the principal steering control section 61M computes the vehicle speed on the basis of the detection signals from the vehicle wheel speed sensors 20, 20. Further, the principal steering control section 61M acquires steering torque data (a value detected by the torque sensor 41B) and operation angle data (a value detected by the operation angle sensor 42B) from the counter force control section 45 via the control signal line C. The principal steering control section 61M controls the driving of the principal steering actuator 51M on the basis of the vehicle speed data, the steering torque data and the operation angle data, and applies a control command to the counter force control section 45 via the control signal line C for controlling the counter force actuator 40.

Instead of the principal steering control section 61M, the counter force control section 45 may perform the aforesaid control operation. In this case, the counter force control section 45 acquires the vehicle speed data from the principal steering control section 61M via the control signal line C. On the basis of the vehicle speed data, and the steering torque data and the operation angle data represented by signals inputted through the signal line L22, the counter force control section 45 controls the driving of the counter force actuator 40, and applies a control command to the principal steering control section 61M via the control signal line C for the driving control of the principal steering actuator 51M.

Further, the auxiliary steering control section 61S may perform the aforesaid control operation. That is, the auxiliary steering control section 61S acquires the vehicle speed data from the principal steering control section 61M via the control signal line C, and acquires the steering torque data and the operation angle data from the counter force control section 45 via the control signal line C. On the basis of the data thus acquired, the auxiliary steering control section 61S applies a control command to the principal steering control section 61M via the control signal line C for the driving control of the principal steering actuator 51M, and applies a control command to the counter force control section 45 via the control signal line C for the driving control of the counter force actuator 40.

In either of the aforesaid cases, the principal steering actuator 51M and the counter force actuator 40 are preferably controlled on an open loop basis without the feedback. Thus, the control system can be simplified.

According to this embodiment, the principal steering control section 61M, the auxiliary steering control section 61S or the counter force control section 45 can perform the control operation on the basis of the detection signals of the sensors 20, 41B, 42B, as described above, when the main electronic control unit 60 malfunctions. Thus, the control operation can thereafter continuously be performed properly according to the conditions of the motor vehicle, even if the main electronic control unit 60 malfunctions.

In accordance with a modification of this embodiment, all the sensor detection signals required when the main electronic control unit 60 malfunctions may collectively be inputted to one of the principal steering control section 61M, the auxiliary steering control section 61S and the counter force control section 45. In this case, the one control section may perform a comprehensive control operation at the malfunction of the main electronic control unit 60.

Figure 2:
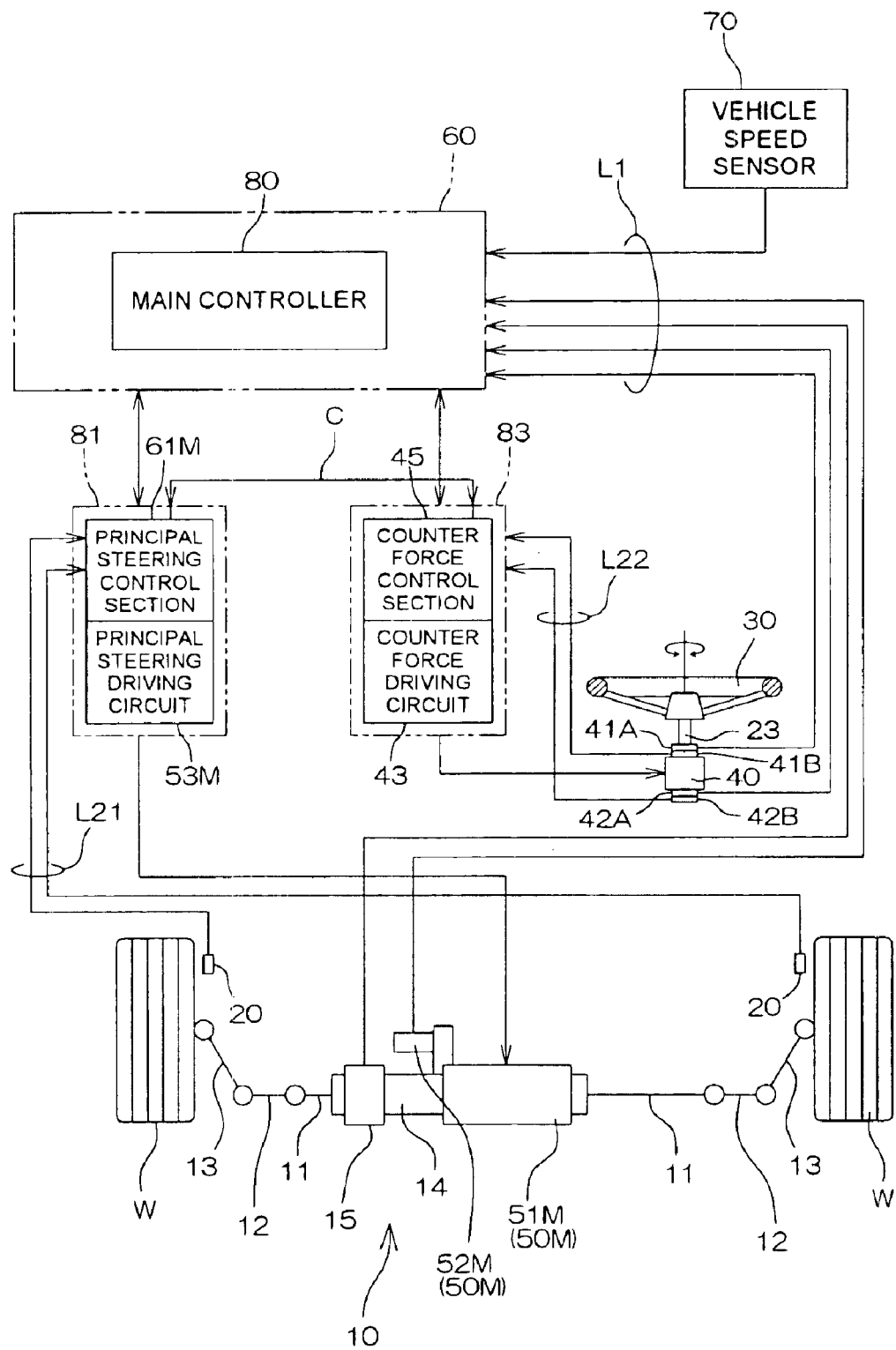
FIG. 2 is a conceptual diagram for explaining the basic construction of a motor vehicle steering system according to a second embodiment of the present invention.
Figure 3:
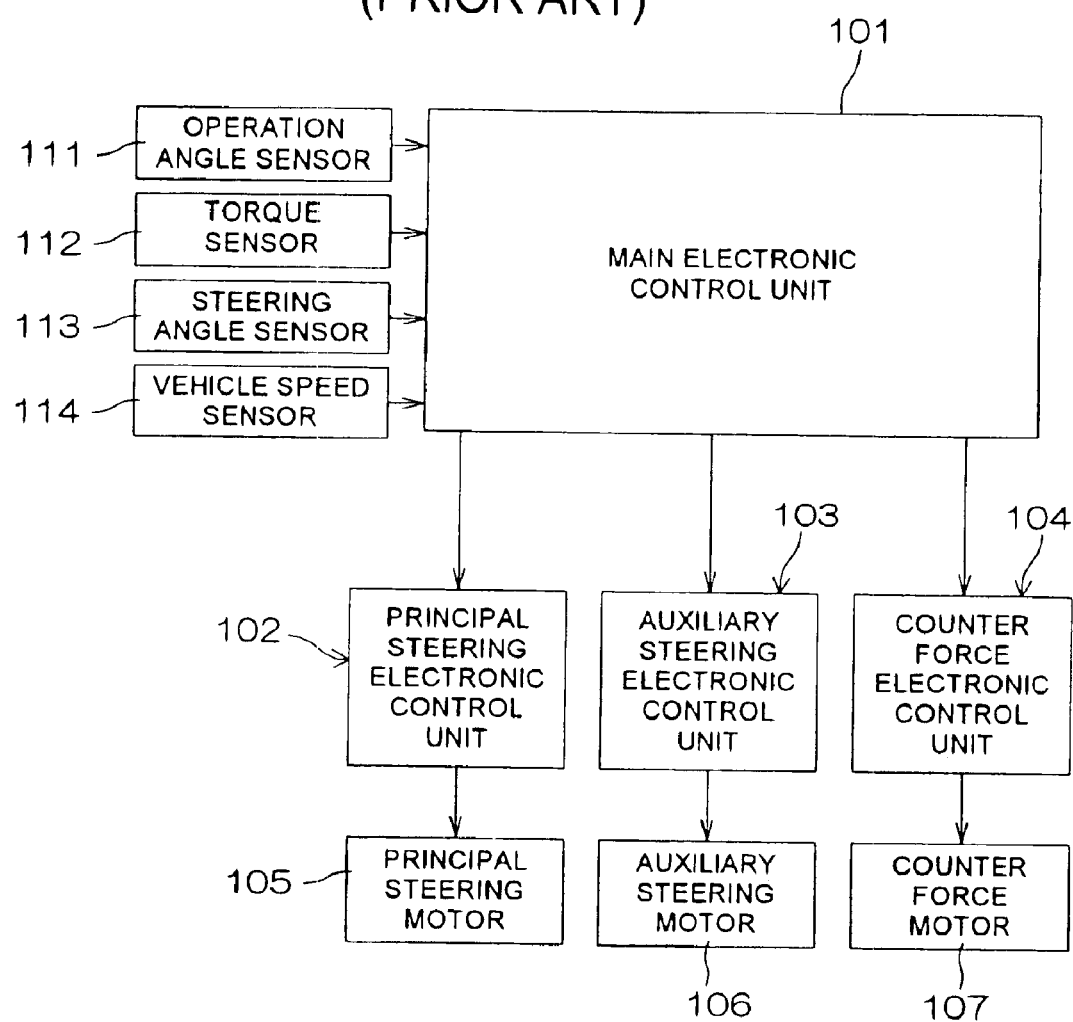
FIG. 3 is a block diagram for explaining the prior art.

FIG. 2 is a conceptual diagram for explaining the construction of a motor vehicle steering system according to a second embodiment of the present invention. In FIG. 2, components corresponding to those shown in FIG. 1 are denoted by the same reference characters as in FIG. 1.

This embodiment has substantially the same construction as the first embodiment, except that the auxiliary steering actuator and associated components are not provided. That is, the driving of the principal steering actuator 51M and the counter force actuator 40 can properly be controlled on the basis of the detection signals inputted to the principal steering control section 61M or the counter force control section 45 from the sensors 41B, 42B, 20 via the signal lines L21, L22, if the main electronic control unit 60 malfunctions.

Thus, this embodiment provides the same effects as the first embodiment described above. Similarly to the first embodiment, the principal steering actuator 51M and the counter force actuator 40 are preferably controlled on an open loop basis for the simplification of the control system.

The second embodiment may be modified in the same manner as the first embodiment.

While the two embodiments of the present invention have thus been described, the invention may be embodied in any other ways. Although the embodiments described above are directed to the case where the steering wheel 30 is employed as the operation member, other types of operation members such as a lever and a pedal may be employed.

Although the steer-by-wire (SBW) system is employed as an example of the motor vehicle steering system in the embodiments described above, the invention is not limited to the steer-by-wire system. The invention is widely applicable to motor vehicle steering systems which are capable of changing a relationship between the operation angle of the operation member and the steering angle of the steering mechanism. For example, the invention may be applied to a steering system (so-called "variable gear-ratio steering (VGS) system") which is capable of changing the ratio (gear ratio) of the steering angle of the steering mechanism to the operation angle of the operation member and has mechanical coupling between the operation member and the steering mechanism.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2002-87959 filed with the Japanese Patent Office on Mar. 27, 2002, the disclosure thereof being incorporated herein by reference.

What is claimed is:

1. A steering system for a motor vehicle, comprising:
    an operation member for steering the motor vehicle;
    a steering mechanism for turning steerable vehicle wheels according to operation of the operation member;
    a principal steering actuator for applying a driving force to the steering mechanism;
    an auxiliary steering actuator capable of applying a driving force to the steering mechanism;
    a counter force actuator for applying a counter force to the operation member according to a reaction force from a road surface;
    a principal steering control section for controlling the principal steering actuator;
    an auxiliary steering control section for controlling the auxiliary steering actuator;
    a counter force control section for controlling the counter force actuator;
    a main controller for comprehensively controlling the principal steering control section, the auxiliary steering control section and the counter force control section;

a first vehicle condition sensor for detecting a vehicle condition related to steering control of the motor vehicle, and generating an output signal which is inputted only to the main controller;

a second vehicle condition sensor for detecting the same vehicle condition as the first vehicle condition sensor, and generating an output signal which is inputted only to at least one of the principal steering control section, the auxiliary steering control section and the counter force control section; and a control signal line interconnecting the principal steering control section, the auxiliary steering control section and the counter force control section, wherein the at least one of the principal steering control section, the auxiliary steering control section and the counter force control section which receives the output signal of the second vehicle condition sensor, is adapted to process the output signal of the second vehicle condition sensor and input a control signal through the control signal line to the other control sections.

2. A motor vehicle steering system as set forth in claim 1, wherein the at least one of the principal steering control section, the auxiliary steering control section and the counter force control section which receives the output signal of the second vehicle condition sensor inputted thereto inputs the control signal to the other control sections through the control signal line, when the main controller malfunctions.

3. A motor vehicle steering system as set forth in claim 2, wherein the at least one of the principal steering control section, the auxiliary steering control section and the counter force control section which receives the output signal of the second vehicle condition sensor inputted thereto performs an open loop control operation on the other control sections by inputting the control signal to the other control sections through the control signal line.

4. A steering system for a motor vehicle, comprising:

an operation member for steering the motor vehicle;

a steering mechanism for turning steerable vehicle wheels according to operation of the operation member;

a principal steering actuator for applying a driving force to the steering mechanism;

a counter force actuator for applying a counter force to the operation member according to a reaction force from a road surface;

a principal steering control section for controlling the principal steering actuator;

a counter force control section for controlling the counter force actuator;

a main controller for comprehensively controlling the principal steering control section and the counter force control section;

a first vehicle condition sensor for detecting a vehicle condition related to steering control of the motor vehicle, and generating an output signal which is inputted to only to the main controller;

a second vehicle condition sensor for detecting the same vehicle condition as the first vehicle condition sensor, and generating an output signal which is inputted only to at least one of the principal steering control section and the counter force control section; and a control signal line interconnecting the principal steering control section and the counter force control section, wherein the one of the principal steering control section and the counter force control section which receives the output signal of the second vehicle condition sensor, is adapted to process the output signal of the second vehicle condition sensor and input a control signal through the control signal line to the other control section.

5. A motor vehicle steering system as set forth in claim 4, wherein the one of the principal steering control section and the counter force control section which receives the output signal of the second vehicle condition sensor inputted thereto inputs the control signal to the other control section through the control signal line, when the main controller malfunctions.

6. A motor vehicle steering system as set forth in claim 5, wherein the one of the principal steering control section and the counter force control section which receives the output signal of the second vehicle condition sensor inputted thereto performs an open loop control operation on the other control section by inputting the control signal to the other control section through the control signal line.

7. A steering system for a motor vehicle, comprising:

an operation member for steering the motor vehicle;

a steering mechanism for turning steerable vehicle wheels according to operation of the operation member;

a principal steering actuator for applying a driving force to the steering mechanism;

a counter force actuator for applying a counter force to the operation member according to a reaction force from a road surface;

a principal steering control section for controlling the principal steering actuator;

a counter force control section for controlling the counter force actuator;

a main controller for comprehensively controlling the principal steering control section and the counter force control section;

a first vehicle condition sensor for detecting a first vehicle condition related to steering control of the motor vehicle, and generating an output signal which is inputted only to the main controller;

a second vehicle condition sensor for detecting a second vehicle condition related to steering control of the motor vehicle, and generating an output signal which is inputted only to one of the principal steering control section and the counter force control section; and a third vehicle condition sensor for detecting a third vehicle condition related to steering control of the motor vehicle, and generating an output signal which is inputted only to the one of the principal steering control section and the counter force control section which is other than the one control section to which the output signal of the second vehicle condition sensor is inputted.

8. A motor vehicle steering system as set forth in claim 7, further comprising a control signal line interconnecting the principal steering control section and the counter force control section, wherein the one of the principal steering control section and the counter force control section which receives the output signal of the second vehicle condition sensor, is adapted to process the output signal of the second vehicle condition sensor and input a control signal through the control signal line to the other control section.

9. A motor vehicle steering system as set forth in claim 8, wherein the one of the principal steering control section and the counter force control section which receives the output signal of the second vehicle condition sensor inputted thereto inputs the control signal to the other control section through the control signal line, when the main controller malfunctions.

10. A motor vehicle steering system as set forth in claim 9, wherein the one of the principal steering control section and the counter force control section which receives the output signal of the second vehicle condition sensor inputted thereto performs an open loop control operation on the other control section by inputting the control signal to the other control section through the control signal line.

11. A motor vehicle steering system as set forth in claim 7, further comprising a control signal line interconnecting the principal steering control section and the counter force control section, wherein the one of the principal steering control section and the counter force control section which receives the output signal of the third vehicle condition sensor, is adapted to process the output signal of the third vehicle condition sensor and input a control signal through the control signal line to the other control section.

12. A motor vehicle steering system as set forth in claim 11, wherein the one of the principal steering control section and the counter force control section which receives the output signal of the third vehicle condition sensor inputted thereto inputs the control signal to the other control section through the control signal line, when the main controller malfunctions.

13. A motor vehicle steering system as set forth in claim 12, wherein the one of the principal steering control section and the counter force control section which receives the output signal of the third vehicle condition sensor inputted thereto performs an open loop control operation on the other control section by inputting the control signal to the other control section through the control signal line.

14. A motor vehicle steering system as set forth in claim 7, wherein the first vehicle condition being sensed is the same as one of the second vehicle condition and the third vehicle condition.

* * * * *